(12) United States Patent
Heyns et al.

(10) Patent No.: US 9,986,687 B2
(45) Date of Patent: Jun. 5, 2018

(54) STONE TRAP ASSEMBLY FOR A HARVESTER

(71) Applicant: CNH Industrial America LLC, New Holland, PA (US)

(72) Inventors: Jolan Heyns, Oostkamp (BE); Marijin Vanslambrouck, Izegem (BE); Gert Mattheeuws, Beernem (BE); Willem De Coninck, Ninove (BE)

(73) Assignee: CNH Industrial America LLC, New Holland, PA (US)

( * ) Notice: Subject to any disclaimer, the term of this patent is extended or adjusted under 35 U.S.C. 154(b) by 0 days. days.

(21) Appl. No.: 15/520,583

(22) PCT Filed: Oct. 20, 2015

(86) PCT No.: PCT/US2015/056431
§ 371 (c)(1),
(2) Date: Apr. 20, 2017

(87) PCT Pub. No.: WO2016/064854
PCT Pub. Date: Apr. 28, 2016

(65) Prior Publication Data
US 2017/0311548 A1    Nov. 2, 2017

(30) Foreign Application Priority Data
Oct. 20, 2014 (BE) .................................. 2014/0753

(51) Int. Cl.
*A01F 12/16* (2006.01)
*A01D 75/18* (2006.01)
(Continued)

(52) U.S. Cl.
CPC .............. *A01F 12/16* (2013.01); *A01D 75/18* (2013.01); *A01D 75/187* (2013.01); *A01D 75/00* (2013.01); *A01F 12/00* (2013.01)

(58) Field of Classification Search
CPC ........ A01F 12/16; A01D 75/18; A01D 75/187
(Continued)

(56) References Cited

U.S. PATENT DOCUMENTS 2,812,766 A * 11/1957 Goffnett .................. A01F 12/16
460/106
3,433,230 A * 3/1969 Larsen .................... A01D 33/00
188/151 A
(Continued)

FOREIGN PATENT DOCUMENTS

EP    0516892 A1    12/1992
EP    1530895 A1 *  5/2005    ............. A01F 12/16
(Continued)

*Primary Examiner* — John Weiss
(74) *Attorney, Agent, or Firm* — Peter K. Zacharias; Patrick M. Sheldrake

(57) ABSTRACT

A stone trap assembly including an entrance and an exit. The entrance receives objects from a crop flow path for accumulation into the assembly during a harvesting operation, and the exit allows evacuation of the accumulated foreign objects out of the assembly during an evacuation operation. The assembly further includes a door configured to be rotatable around a first rotation axis, substantially transverse to the crop flow path, for movement along a door movement trajectory between a closed position and an evacuation position, and an impeller for forcing the accumulated foreign objects towards the exit. The impeller is configured to be rotatable around a second rotation axis, substantially transverse to the crop flow path, for movement along an impeller movement trajectory between a retracted position and an extended position closer towards the exit. The door and impeller are separately movable during at least a part of the trajectories.

20 Claims, 6 Drawing Sheets

(51) Int. Cl.
*A01D 75/00* (2006.01)
*A01F 12/00* (2006.01)

(58) Field of Classification Search
USPC .......................................... 460/2, 105, 106
See application file for complete search history.

(56) References Cited

U.S. PATENT DOCUMENTS

| | | | |
|---|---|---|---|
| 3,576,188 A | | 4/1971 | Tanis |
| 3,645,269 A | * | 2/1972 | Peruski ................ A01F 12/00 460/106 |
| 3,664,348 A | | 5/1972 | Maiste et al. |
| 3,971,390 A | * | 7/1976 | McDuffie ............. A01F 12/16 209/658 |
| 4,288,969 A | * | 9/1981 | Underhill ............. A01F 12/16 460/105 |
| 4,446,875 A | * | 5/1984 | Deleu .................. A01F 12/16 460/106 |
| 5,019,014 A | | 5/1991 | Hirsch et al. |
| 5,273,488 A | * | 12/1993 | Hollevoet ............. A01F 12/16 460/106 |
| 5,882,257 A | | 3/1999 | Cooksey et al. |

FOREIGN PATENT DOCUMENTS

| | | |
|---|---|---|
| EP | 2294909 A1 | 3/2011 |
| WO | WO2015028854 A1 * | 8/2013 |

* cited by examiner

STONE TRAP ASSEMBLY FOR A HARVESTER

CROSS REFERENCE TO RELATED APPLICATION

This application is the National Stage of International Application No. PCT/US2015/056431 filed Oct. 20, 2015, which claims priority to Belgian Application No. 2014/0753 filed Oct. 20, 2014, the contents of which are incorporated herein by reference.

FIELD OF THE INVENTION

The invention concerns a stone trap assembly for a harvester, for example a combine harvester. Such stone trap assembly enables accumulation of the stones or other foreign objects from the crop stream in order to avoid damage to downstream crop handling equipment, such as for example a threshing mechanism of a combine harvester.

BACKGROUND OF THE INVENTION

Such a stone trap assembly for a harvester is for example known from U.S. Pat. No. 3,576,188. FIGS. 1 and 2 of U.S. Pat. No. 3,576,188 show a stone-catching gap 50 between the discharge edge 42 of the feeder portion 41 and the leading edge 33 of the threshing mechanism 32. This stone catching gap thus forms an entrance of the stone trap assembly which allows reception of foreign objects from a crop flow path for accumulation into the stone trap assembly. During a harvesting operation, after an initial phase in which the stone trap assembly gets filled with crop, the crop flow path moves along this entrance from the feeder to the threshing mechanism. Any stones or other foreign objects are propelled, in the example of U.S. Pat. No. 3,576,188 by the threshing drum 31, through the entrance into the stone trap assembly for accumulation. At regular intervals, for example in between two consecutive harvesting operations, the operator of the harvester will perform an evacuation operation in order to remove the accumulated foreign objects from the stone trap assembly. According to the example of US376188, this is done by rotating a door, formed by an elongate plate 64 and elastomeric sheet 66, around a transverse axis 63 from a closed position in which it closes off an exit at the bottom of the stone trap assembly, to an evacuation position shown in dot stripe lines in FIG. 2 of U.S. Pat. No. 3,576,188 in which the door opens up this exit such that accumulated foreign objects can be evacuated during the evacuation operation. As shown, this rotation can be performed manually by means of a suitable handle. As further shown in FIGS. 2 and 3 of U.S. Pat. No. 3,576,188 the stone trap assembly further comprises a transverse rear edge 73 formed by a plurality of bars 71 that, are attached to the pivot shaft 62, for simultaneous rotation around the transverse axis 63 with the door. As shown these bars 71 form an impeller that is movable, simultaneously with the door, between a retracted position when the door is in the closed position as shown in full lines in FIG. 2 of U.S. Pat. No. 3,576,188 and an extended position when the door is in the evacuation position as shown in dot stripe lines in FIG. 2. It is clear that in its retracted position the impeller generally allows accumulation of the foreign objects during the harvesting operation. When the impeller is moved by means of a rotation from its retracted position to its extended position, which is closer towards the exit, the impeller forces the accumulated foreign objects towards the exit of the stone trap assembly during the evacuation operation.

One problem with such a known stone trap assembly is that the impeller forces the crop and foreign objects against the front wall during the evacuation operation, thereby reducing the efficiency of the evacuation operation as there is an increased risk for some of the crop and foreign objects to clog or adhere to the impeller, the door and/or the front wall of the stone trap assembly. Additionally, the impeller reduces accessibility to harvesting mechanisms in the vicinity of the stone trap assembly. This is caused by the fact that when the door is in the opened position, the impeller, which is then in the extended position, blocks access, through the exit and subsequently the entrance of the stone trap assembly, to elements such as the downstream end of the feeder or the inlet of the threshing mechanism. Such access is for example required when servicing these components or when removing or inspecting the cause of a blockage or overload of these mechanisms.

A further stone trap assembly is known from U.S. Pat. No. 5,019,014, which is generally of a similar construction as U.S. Pat. No. 3,576,188. It also comprises an impeller, formed by a longitudinal plate or rake like elements, which in the retracted position are aligned with the back wall of the stone trap assembly. During an evacuation operation a handle can be operated to rotate the impeller 48 together with the door 14 around a hinge pin 34 as shown in the Figure of U.S. Pat. No. 5,019,014 to an extended position (not shown). It is clear that also this stone trap assembly experiences similar problems as described above with reference to US376188.

A further stone trap assembly is known from EP1530895. This stone trap assembly comprises a door which can be moved between an open and an evacuation position, but does not comprise an impeller that is moved together with this door. This stone trap assembly comprises a back wall 76, which, as shown in FIG. 3 of EP1530895 can be removed from its fixed mounting position in order to improve accessibility for servicing elements behind it. The removal of the back wall is a time consuming operation and the lack of an impeller leads to a less efficient evacuation operation of the stone trap assembly.

Still a further stone trap assembly is known from EP2294909, which comprises an elastic wiper that can be deformed to wipe along the transverse back wall of the stone trap assembly when the door moves from closed position to the evacuation position by means of a linear hydraulic actuator. Such a wiper is able to act upon material clogged to this back wall in an attempt to release it, however it does not function as an impeller as the wiper is not able to force the accumulated foreign objects within the stone trap assembly towards the exit of the stone trap assembly. It is further clear that near its mounting point on the back wall the flexible bar of the wiper will not be able to wipe this part near the center of the surface of the back wall, which results in a wiping operation that does not affect any of the material near the center of the stone trap assembly.

Therefor there still exists a need for an improved stone trap assembly which can be operated to allow for a robust and efficient evacuation operation which reduces the risk of compacting or adhering the crop or foreign objects to the stone trap assembly and additionally allows for improved accessibility for inspecting and servicing harvester components via the stone trap assembly.

SUMMARY OF THE INVENTION

According to a first aspect of the invention there is provided a stone trap assembly for a harvester, the stone trap assembly comprising:

an entrance configured to allow reception of foreign objects from a crop flow path for accumulation into the stone trap assembly during a harvesting operation;

an exit configured to allow evacuation of these accumulated foreign objects out of the stone trap assembly during an evacuation operation;

a door configured to be rotatable around a first rotation axis, substantially transverse to the crop flow path, for movement along a door movement trajectory between a closed position, in which the door closes off the exit; and an evacuation position, in which the door opens up the exit;

an impeller for forcing the accumulated foreign objects towards the exit, configured to be rotatable around a second rotation axis, substantially transverse to the crop flow path, for movement along an impeller movement trajectory between a retracted position and an extended position closer towards the exit, wherein the door and the impeller are separately movable during at least a part of the door movement trajectory and/or the impeller movement trajectory.

In this way an efficient evacuation operation for the accumulated foreign objects can be realized as this allows the door to reach a suitable position separately from the impeller, for example, in order to enable the impeller to perform its action for expelling the foreign objects with a reduced risk of compacting or adherence of such foreign objects to the stone trap assembly; or to enable the door to reach the open, evacuation position without the impeller blocking the access through the stone trap assembly for inspecting or servicing harvester components behind it. The door and the impeller may be rotatable about the same axis, i.e. the first and second rotation axes may coincide, or may each rotate about a separate axis.

According to an embodiment the stone trap assembly further comprises a drive assembly coupled to the door and the impeller, and configured to separately move the door and the impeller during at least a part of the door movement trajectory and/or the impeller movement trajectory.

In this way the stone trap assembly can be remotely operated by an operator, for example from the cabin of the harvester, which increases efficiency of an evacuation operation. Such arrangement also reduces the risk associated with the operator being in the vicinity of the evacuated foreign objects and the moving parts of the stone trap assembly during an evacuation operation. Additionally this allows for performing the evacuation operation in an automated way when for example the drive is under control of a suitably programmed controller upon reception of a suitable command from an operator, thereby still further increasing user friendliness.

According to still a further embodiment the drive assembly is further configured to keep the impeller positioned in the retracted position until the door has moved, during an initial phase of an evacuation operation, along an initial range of the door movement trajectory, at least partly from the closed position to the evacuation position during an initial phase of the evacuation operation.

In this way the risk of compacting or adhering crop or foreign objects to the stone trap assembly during an evacuation operation is reduced as the exit is at least partly opened by the door before the impeller forces the crop and foreign objects towards the exit. Additionally, as the exit is opened by the door, and as the impeller, as it remains in the retracted position, does not obstruct the passage from the exit to the entrance through the stone trap assembly, inspection and servicing of harvester components located behind it is facilitated.

According to still a further embodiment the drive assembly is further configured to move the impeller along the impeller movement trajectory, at least partly from the retracted position to the extended position during a subsequent phase of the evacuation operation.

In this way the efficiency of the operation of the impeller is increased as the impeller forces the crop towards an exit that was at least partially opened during the preceding initial phase of the evacuation operation.

According to still a further embodiment the drive assembly comprises a single actuator and a coupler, said actuator being directly coupled to the door and via the coupler to impeller, said drive assembly being configured such that:

during the initial phase of the evacuation operation, the coupler keeps the impeller positioned in the retracted position while the actuator moves the door along the initial range of the door movement trajectory; and during the subsequent phase of the evacuation operation, the coupler provides the movement of the actuator to the impeller such that the impeller moves along the impeller movement trajectory, at least partly from the retracted position to the extended position, while the actuator continues the movement of the door towards the evacuation position along a subsequent range of the door movement trajectory.

In this way a simple embodiment of the stone trap assembly can be realized only requiring the use of a single actuator.

According to still a further embodiment the coupler is configured to:

allow movement of the actuator along an initial range of an actuator movement trajectory, which provides the movement of the door during the initial range of the door movement trajectory, without imparting movement to the impeller; and provide the movement of the actuator to the impeller during movement of the actuator along a subsequent range of the actuator movement trajectory which provides for the movement of the door along the subsequent range of the door movement trajectory.

In this way the coupler allows for an efficient evacuation operation which can be realized with a simple movement trajectory of the actuator in which the coupler allows movement of the actuator during its initial range of movement without imparting movement to the impeller; and the coupler imparts movement to the impeller caused by the movement of the actuator during its subsequent range of movement.

According to still a further embodiment the coupler comprises:

a guide coupled to the impeller and the actuator and dimensioned to allow movement of the actuator with respect to the impeller during its initial range of its actuator movement trajectory;

a first stop coupled to the impeller and positioned such that, at the beginning of its initial range of its actuator movement trajectory, the actuator abuts this first stop, such that the impeller is held in its retracted position, when the door is in its closed position; and a second stop coupled to the impeller and positioned such that, at the end of its initial range of its actuator movement trajectory, the actuator abuts this second stop, such that the movement of the impeller is imparted by the actuator during its subsequent range of movement.

In this way a particularly simple and robust implementation of the coupler is provided.

According to an alternative embodiment the drive assembly comprises a door actuator and an impeller actuator, said door actuator being coupled to the door and said impeller actuator being coupled to the impeller, said door actuator and said impeller actuator being configured to separately move respectively the door and the impeller during at least a part of the door movement trajectory and/or the impeller movement trajectory.

In this way a flexibility is obtained for enabling separate movement of the door and the impeller during any desired range of their respective movement trajectory in an automated way in order to improve the efficiency of an evacuation operation or to facilitate servicing operations.

According to still a further embodiment the door and/or the impeller are rotatably mounted such that they are selectively movable by means of a rotating movement around a respective rotation axis transverse to the crop flow path.

In this way a simple and robust arrangement of the door and/or impeller is provided, which is compatible with existing stone trap assemblies, thereby facilitating retrofitting of the stone trap assembly to existing harvesters.

According to still a further embodiment the stone trap assembly further comprises a front wall and a back wall, both extending between the entrance and the exit, and extending longitudinally along a transverse direction transverse to the crop flow path; the front wall arranged upstream along the crop flow path with respect to the back wall.

In this way the entrance and exit are defined as the gap between the bordering front wall and back wall, thereby providing a simple and robust embodiment of the stone trap assembly which can be formed by means of elongate elements such as suitable plates of metal or any other suitable material. This is further also compatible with existing stone trap assemblies, which facilitates retrofitting to existing harvesters.

According to still a further embodiment the impeller at least partly comprises the back wall or the front wall.

In this way a simple and robust impeller is realized with a reduced risk of material getting trapped between the impeller and the adjacent wall that could prevent the impeller from moving back to its retracted position.

According to a second aspect of the invention there is provided a method of operating a stone trap assembly according to the first aspect of the invention, characterized in that the method comprises the step of moving the door and the impeller separately during at least a part of the door movement trajectory and/or the impeller movement trajectory.

In this way the stone trap assembly can be operated either manually or automatically in a more flexible way that for example enables an increased efficiency of an evacuation operation or increases accessibility through the stone trap assembly for servicing or inspection of harvester components.

According to an embodiment the method comprises a step of keeping the impeller positioned in the retracted position until the door has moved, during an initial phase of an evacuation operation, along an initial range of the door movement trajectory, at least partly from the closed position to the evacuation position during an initial phase of the evacuation operation.

In this way an evacuation operation with a reduced risk of compacting or adhering crop or foreign objects to the stone trap assembly is realized as the exit is at least partly opened by the door before the impeller forces the crop and foreign objects towards the exit. Additionally, inspection and servicing of harvester components located behind the stone trap assembly is facilitated, as the exit is opened by the door while the impeller remains in the retracted position thereby avoiding obstruction of the passage from the exit to the entrance through the stone trap assembly.

According to a further embodiment the method comprises the subsequent step of moving the impeller along the impeller movement trajectory at least partly from the retracted position to the extended position during a subsequent phase of the evacuation operation.

In this way the efficiency of the operation of the impeller is increased as the impeller forces the crop towards an exit that was at least partially opened during the preceding initial phase of the evacuation operation.

According to a further embodiment, during the subsequent phase of the evacuation operation:

the impeller is reciprocatingly moved one or more times, respectively at least partly towards the retracted position and the extended position; and/or the door is reciprocatingly moved one or more times, respectively at least partly towards the closed position and the evacuation position.

In this way the efficiency of the operation of the impeller is still further increased as the impeller can repeat one or more additional times its expelling motion towards the exit, thereby increasing the likelihood that clogged or partially removed objects after the first expelling motion will also be loosened and evacuated. Also shaking the door in this way can further reduce the risk of any clogged material remaining present in the stone trap assembly after an evacuation operation.

BRIEF DESCRIPTION OF THE DRAWINGS

Exemplary embodiments will now be described with reference to the accompanying drawings in which.

DETAILED DESCRIPTION OF THE INVENTION

Figure 1:
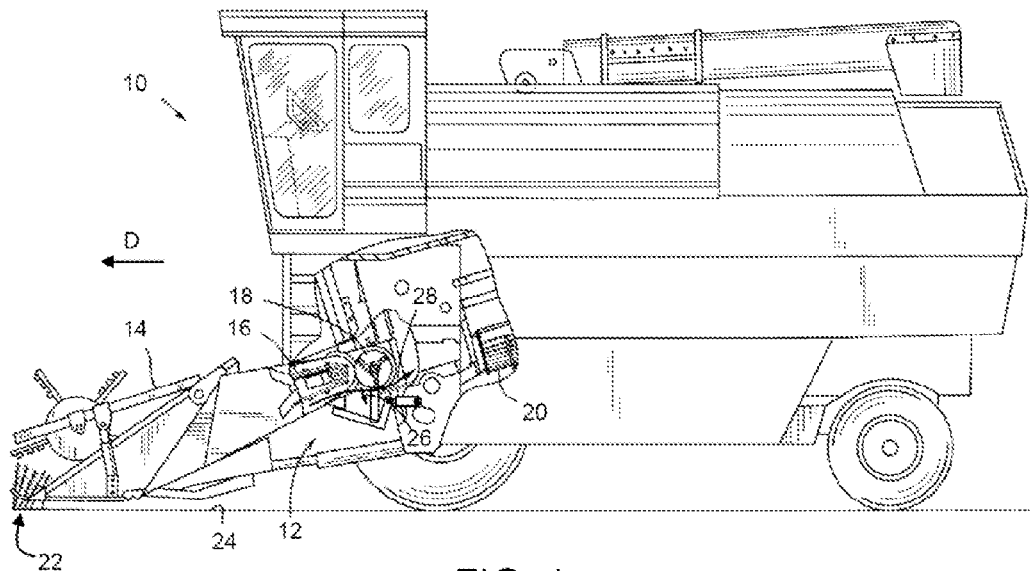
FIG. 1 schematically shows a side view of an embodiment of a harvester comprising a stone trap assembly according to the invention.

FIG. 1 schematically shows a side view of a harvester 10 in the form of a combine harvester for example for harvesting various crops such as corn, wheat, soybeans, oats, etc. This side view is partially sectioned in order to more clearly illustrate the location of the stone trap assembly 12 in relation to the other functional assemblies of the harvester 10. As shown, such a combine harvester 10 comprises largely these functional assemblies along the crop flow path 28: a header 14, feeder 16, an optional feed beater 18 and a threshing assembly 20. Header 14 is positioned at a front end of the combine harvester 10 and cuts the crop 22 from the ground surface 24 on which the combine harvester 10 travels substantially along the driving direction D. Although header 14 is schematically shown as a grain header, which is removably mounted to a front end of a combine harvester 10, header 14 may alternatively be fixedly connected to the combine harvester 10 and may alternatively comprise any suitable type of header or other crop severing mechanisms such as for example corn headers, headers suitable for harvesting other types of crop, stripper headers, grass pick-ups, etc. As shown, the header 14 conveys the cut crop along the direction of the crop flow path 28, generally opposite to the driving direction D towards feeder 16 which comprises a feeder chain or any other suitable conveyor mechanism suitable to transport the crop received from the header 14 to other functional groups of the combine harvester 10 which are located downstream along the crop flow path 28, such as for example an feed beater 18 and a threshing assembly 20. It is clear that according to alternative embodiments of the combine harvester 10 other suitable arrangements of functional groups could be possible, such as for example an arrangement without a feed beater 18 in which the threshing assembly 20 follows the feeder 16. Still further alternative embodiments of harvesters 10, such as for example forage harvesters, etc. and corresponding suitable arrangements of functional groups are also possible.

As shown in the embodiment of FIG. 1, there is provided a feed beater 18 which extends generally transverse to the crop flow path 28 and is rotatably supported by the frame of the harvester 10 in the vicinity of the stone trap assembly 12 between feeder 16 and threshing assembly 20. Feed beater 18 receives the cut crop from feeder 16 and conveys it towards and into threshing assembly 20 along the crop flow path 28. As indicated by arrow 26, stones, rocks and/or other foreign objects, which are generally denser than the cut crop, are accumulated into the stone trap assembly 12. According to the embodiment shown in FIG. 1, typically, the rotation of the feed beater 18 along its longitudinal axis of rotation, impacts and propels the stones or other foreign objects out of the cut crop into the stone trap assembly 12. However it is clear that according to alternative embodiments, where no feed beater 18 is present, stones or other foreign objects could be impacted and projected into the stone trap assembly 12 under the influence of other elements in the vicinity of the stone trap assembly 12, such as for example elements of the feeder 16 or the threshing assembly 20. In this way, during a harvesting operation, the stones and other foreign objects are removed from the cut crop, upstream of the threshing assembly 20 where they could cause damage to threshing assembly 20 and other downstream crop handling components of combine harvester 10.

Figure 2:
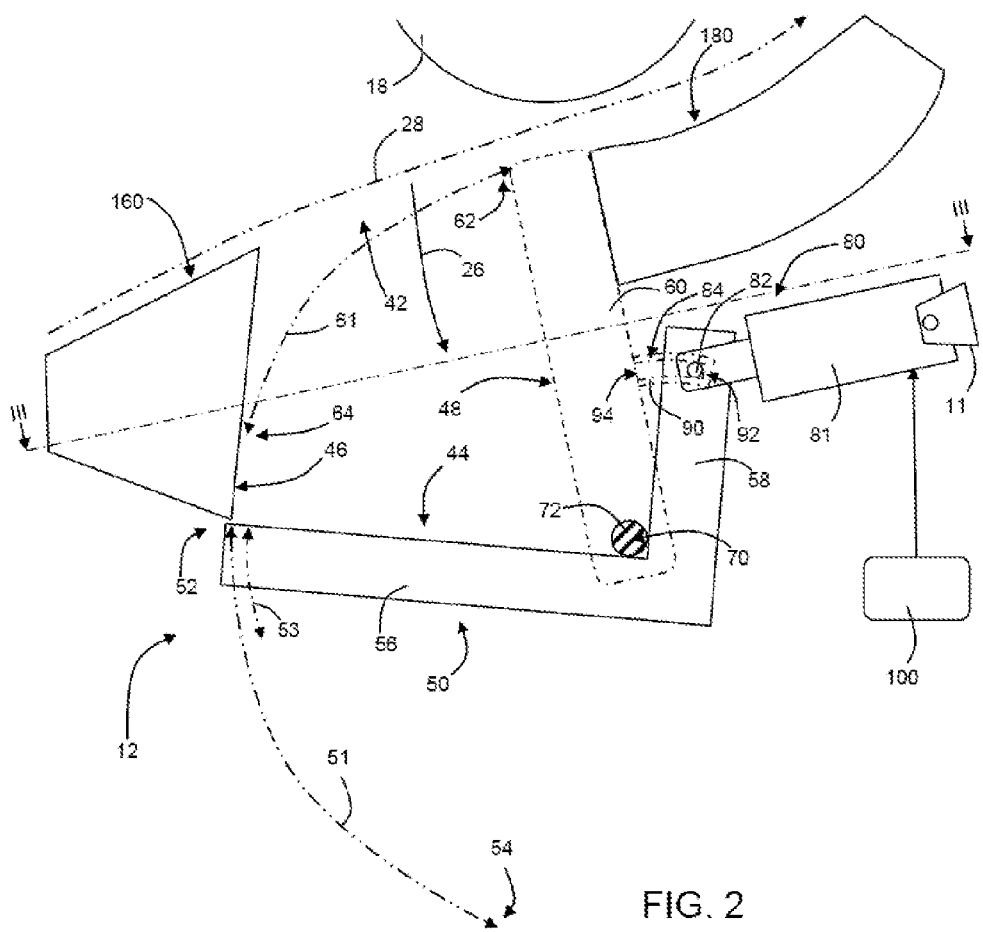
FIG. 2 schematically shows a side view of an embodiment of the stone trap assembly of FIG. 1 in further detail during an initial phase of its method of operation.

FIG. 2 schematically shows a side view of an embodiment of the stone trap assembly 12 of FIG. 1 in further detail. As clearly shown, the stone trap assembly 12 is arranged below the crop flow path 28 of the harvested crop. As further shown, according to this embodiment, in the area shown in FIG. 2, the harvested crop flows along an upstream guide surface 160 formed by a floor plate of the feeder 16, along the stone trap assembly 12 towards a downstream guide surface 180 arranged below the feed beater 18. As explained above, stones or other foreign objects are projected by the feed beater 18 out of the crop flow path 28 for accumulated into the stone trap assembly 12 along the direction indicated by arrow 26. During a harvesting operation, these foreign objects enter into the stone trap assembly 12 from the crop flow path 28 through entrance 42. When the accumulation of foreign objects into the stone trap assembly 12 has reached a certain level, the operator will initiate an evacuation operation in order to evacuate these accumulated foreign objects out of the stone trap assembly 12 through exit 44. According to the embodiment shown in FIG. 2, both the entrance 42, at the upper end of the stone trap assembly 12 and the exit 44 at the lower end of the stone trap assembly 12 are bordered by a front wall 46 and a back wall 48. As shown, the front wall 46 is arranged upstream with respect to the crop flow path 28 to the back wall 48. As shown, both the front wall 46 and the back wall 48 extend downwards between the entrance 42 and the exit 44, which thus means the entrance 42 is formed as a gap between the front wall 46 and the back wall 48. This thus also means that the entrance 42 can be seen as the gap extending between the upstream guide surface 160 and the downstream guide surface 180.

Figure 3:
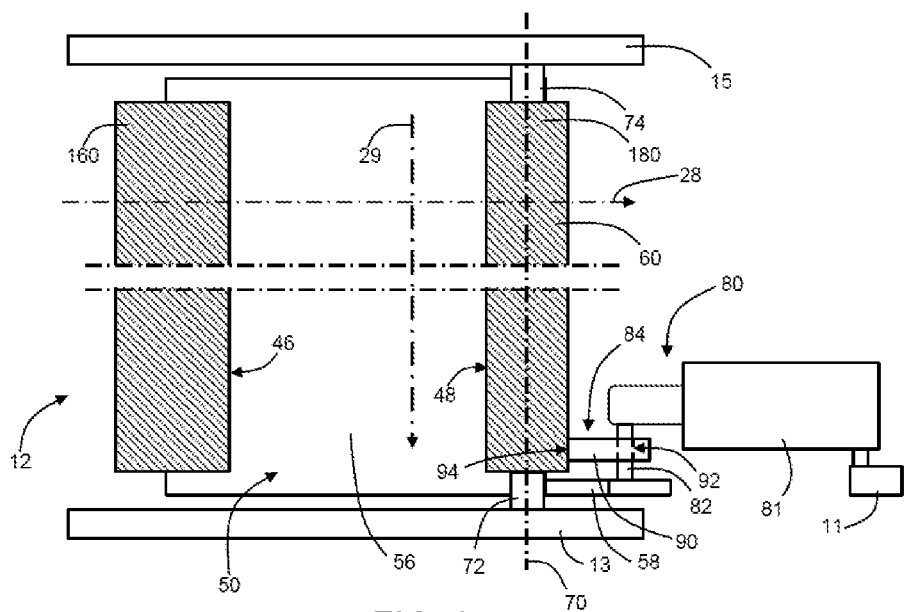
FIG. 3 schematically shows a section along line of FIG. 2.

It is clear from FIG. 3, which schematically shows a section along line of FIG. 2, that both the front wall 46 as the back wall 48 extend longitudinally generally along a transverse direction 29, substantially transverse to the crop flow path 28, in between a first lateral side 13 and a second lateral side 15 of the frame of the feeder 16 or any other suitable frame of the harvester 10. Both the front wall 46 and the back wall 48 of the stone trap assembly 12 in this way thus comprise a longitudinally extending wall along the transverse direction 29, as shown in FIG. 3, which extends between the entrance 42 and the exit 44 of the stone trap assembly 12 as shown in FIG. 2. It is clear that the front wall 46 and the back wall 48 could be formed by means a suitable metal plate extending along the transverse direction, or any other suitable implementation know to the man skilled in the art.

Figure 6:
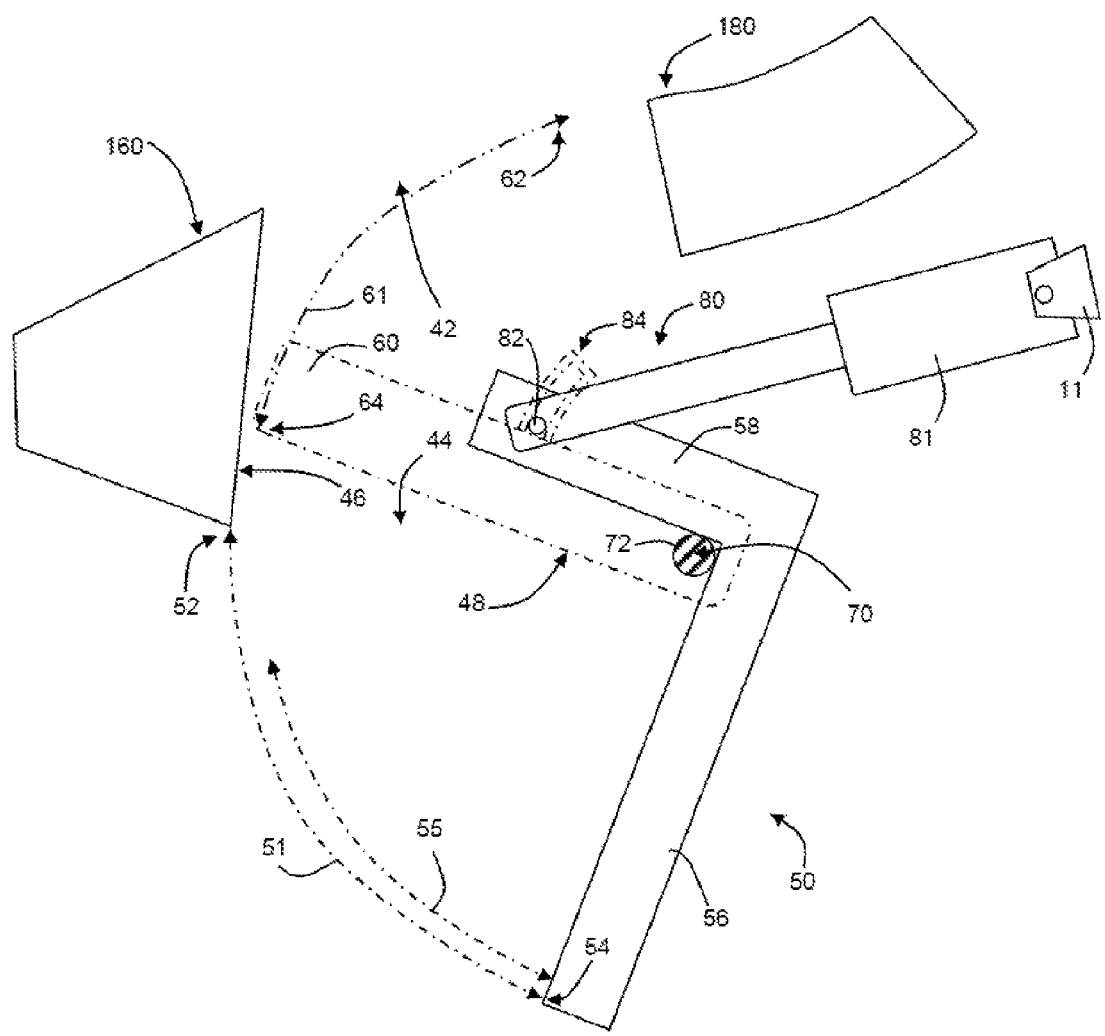

As further shown in FIGS. 2 and 3, the stone trap assembly 12 further comprises a door 50 which closes off the exit 44. This door 50 then forms a bottom wall 56 for the stone trap assembly 12 that closes off the exit 44 by extending longitudinally along transverse direction 29 in the vicinity of the exit 44 in such a way that the area between the front wall 46 and the back walls 48 is covered. The door 50 further comprises a lever arm 58 connected at one end to the bottom wall 56 and at its other end to a linear actuator 81 of a drive assembly 80. The door 50 is further rotatably connected to lateral fulcrums 72, 74 for rotation about a rotation axis 70 which extends substantially along the transverse direction 29. These fulcrums 72, 74, are for example formed as suitable shaft stubs mounted to the respective lateral sides 13, 15 of the frame of the feeder 16 or another suitable frame of the harvester. The lever arm 58 is directly connected by means of a pivot pin 82 to one end of the linear actuator 81, which is for example a suitable hydraulic, pneumatic or electromagnetic actuator. The other end of the linear actuator 81 is for example connected to the frame 11 of the feeder 16 or another suitable frame of the harvester 10. In FIG. 2, the door 50 is shown in a closed position 52 in which the door 50 closes off the exit 44, such that the foreign objects can be accumulated during the harvesting operation. As will be explained further below, during an evacuation operation for removing the accumulated foreign objects from the stone trap assembly, the door 50 can be moved, by means of the linear actuator 81, between the closed position 52 shown in FIG. 2 and an evacuation position 54 as shown in FIG. 6 along a door movement trajectory 51. As shown in FIG. 6, in this evacuation position 54 the door 50 opens up the exit 44 for evacuating accumulated foreign objects from the stone trap assembly 12 during an evacuation operation. In order to move the door 50 between the closed position 52 and the evacuation position 54, the linear actuator 81 imparts an actuator movement trajectory to the pivot pin 82 comprising a movement range between two extreme positions, this means a position in which the linear actuator 81 is most extended, as shown in FIG. 6, and a position in which the linear actuator is most retracted, as shown in FIG. 2. This actuator movement trajectory imparted by the linear actuator 81 to the pivot pin 82, is transmitted to the free end of the lever arm 88 by this pivot pin 82. It is clear that pivot pin 82 according to this embodiment is arranged axially along the rotation axis 70 and thus allows for a relative rotation of the lever arm 88 with respect to the linear actuator 81 in the plane transverse to this rotation axis 70. In this way the linear movement of the linear actuator 81 is converted to a rotating movement of the lever arm 88 around the fulcrum 72. It is clear that this rotating movement of the lever arm 88 also causes a similar rotating movement around the fulcrum 72 of the bottom wall 56 of the door 50, which is fixedly connected to the lever arm 88. This thus means that the door 50 according to this embodiment is imparted a rotating movement around the rotation axis 70 along the transverse direction 29, transverse to the crop flow path 28 by the drive assembly 80. As shown, this also means that the door 50, and more specifically its bottom wall 56, is movable along a door movement trajectory 51 between the closed position 52 shown in FIG. 2 and the evacuation position 54 of FIG. 6, by moving the linear actuator 81 between both extreme positions of its actuator movement trajectory. As shown in FIG. 2, the movement of the linear actuator 81 of the drive assembly 80 along its actuator movement trajectory can be controlled by means of suitable controller 100, as will be explained in further detail below.

As further shown in FIGS. 2 and 3, this embodiment comprises an impeller 60 that comprises the downstream back wall 48 of the stone trap assembly 12. As shown, according to this embodiment, the impeller 60 is also rotatably mounted on the fulcrums 72, 74 such that it is movable by means of a rotating movement around the rotation axis 70 along an impeller movement trajectory 61 between a retracted position 62 as shown in FIG. 2 and an extended position 64 as shown in FIG. 6. In contrast to the door 50 which is directly coupled to the linear actuator 81 by means of a pivot pin 82 or any other suitable direct connection, the drive assembly 80 comprises a coupler 84 for coupling the impeller 60 to the linear actuator 81. As shown, according to this embodiment, the coupler 84 comprises a guide 90 coupled to the impeller 60 in which the pivot pin 82 is allowed a sliding movement during an initial range of the actuator movement trajectory of the actuator 81, as will be explained in further detail below. The coupler 84 further comprises a first stop 92, which, according to this embodiment, is formed by means of the end of the guide 90 most remote from the impeller 60. As will be explained in more detail with reference to FIG. 4, the coupler 84 also comprises a second stop 94 formed by the end of the guide 90 most proximate to the impeller 60. FIGS. 2 and 3, show the door 50 in its closed position 52, and the impeller 60 in its retracted position 62. In this retracted position 62 the impeller 60, which according to this embodiment forms the back wall 48 of the stone trap assembly 12, allows for the accumulation of foreign objects in the stone trap assembly 12 during the harvesting operation as it does not obstruct passage of such foreign objects through the entrance 42 of the stone trap assembly 12. As will be explained in further detail below, during an evacuation operation, the impeller 60 is movable along the impeller movement trajectory 61 from this retracted position 62 to the extended position 64 by which the impeller 60 forces accumulated foreign objects towards the exit 44. It is clear that in the position of the linear actuator 81 shown in FIGS. 2 and 3, in which the actuator 81 of the drive assembly 80 holds the door 50 in the closed position 52, the pivot pin 82 abuts the first stop 92 at the end of the guide 90 most remote from the impeller 60. Thereby, linear actuator 81 and coupler 84 of the drive assembly 80 cooperate to hold the impeller 60 in its retracted position 62. During a harvesting operation this position of both the door 50 and the impeller 60 allows accumulation of foreign objects in the stone trap assembly 12 as the impeller 60 does not obstruct accumulation of foreign objects through the entrance 42 of the stone trap assembly 12 and the door 50 closes off the exit 44. It should be noted that the impeller 60 and the coupler 84 are shown in dot stripe lines in FIGS. 2 and 4 to 6, merely in function of clearly showing all relevant parts of these connected components, which would otherwise be partly covered by other components of the stone trap assembly 12. It should further be noted that alternative embodiments of the impeller 60 are possible, for example instead of comprising the back wall 48 entirely, the impeller 60 could be formed as a suitable elongate plate, or a suitable rake like assembly, toothed plate, a series of bars, etc. that are for example positioned in front of a separate fixed back wall, similar as for example known from U.S. Pat. No. 5,019,014. According to still further alternative embodiments the impeller 60 could at least partly comprise the front wall.

During a subsequent evacuation operation for evacuating the foreign objects from the stone trap assembly 12, both the door 50 and the impeller 60 are moved from the position shown in FIG. 2 along the positions shown in FIGS. 4 and 5, to the position shown in FIG. 6, as will be explained in further detail below, and subsequently back to the position of FIG. 2, upon which the harvesting operation can be continued with an emptied stone trap assembly 12. During an initial phase of the evacuation operation the stone trap assembly 12 is moved from its state shown in FIG. 2 to that shown in FIG. 4. During this initial phase of the evacuation operation the drive assembly 80 keeps the impeller 60 positioned in the retracted position 62 while it moves the door 50 partly from the closed position 52 to the evacuation position 54 along an initial range 53 of the door movement trajectory 51. It is clear that, according to the embodiment shown, during this initial phase of the evacuation operation, the actuator 81 of the drive assembly 80 imparts an initial range of the actuator movement trajectory to the pivot pin 82, from a position, as shown in FIG. 2, in which it abuts the first stop 92 at the beginning of this initial range of the actuator movement trajectory. This initial range of the actuator movement trajectory then continues by the pivot pin 82, sliding along the guide 90 until the pivot pin 82 abuts the second stop 94 at the end of this initial range of the actuator movement trajectory as shown in FIG. 3. According to this embodiment the second stop 94 is formed by the end of the guide 90 most proximate to the impeller 60. It is clear that in this way the coupler 84 allows for a sliding movement of the actuator 81 with respect to the impeller 60 during the initial range of the actuator movement trajectory. It is clear that normally the impeller 60 will remain biased in the retracted position 62 during this sliding movement of the actuator by the pressure provided by the accumulated crop and foreign objects inside the stone trap assembly 12, however according to alternative embodiments there could be provided biasing elements, such as for example a suitable spring acting on the impeller 60 in order to generate a suitable biasing force to bias the impeller 60 towards the retracted position 62. As the door 50 is directly coupled to the actuator 81, it is clear that during the initial phase of the evacuation operation, while the actuator 81 moves along the initial range of the actuator movement trajectory the door travels along the corresponding initial range 53 of the door movement trajectory 51. Thus, as the actuator 81 is directly coupled to the door 50 and via the coupler 84 to impeller 60, as explained above, during the initial phase of the evacuation operation, the coupler 84 keeps the impeller 60 positioned in the retracted position 62 while the actuator 81 moves the door 50 along the initial range 53 of the door movement trajectory 51. In general the drive assembly 80 thus keeps the impeller 60 positioned in the retracted position 62 until the door 50 has moved, along the initial range 53 of the door movement trajectory 51, at least partly from the closed position 52 to the evacuation position 54 during this initial phase of the evacuation operation. It is clear that in this way the drive assembly 80 moves the door 50 along the initial range 53 of the door movement trajectory 51 separately from the impeller 60.

Figure 4:
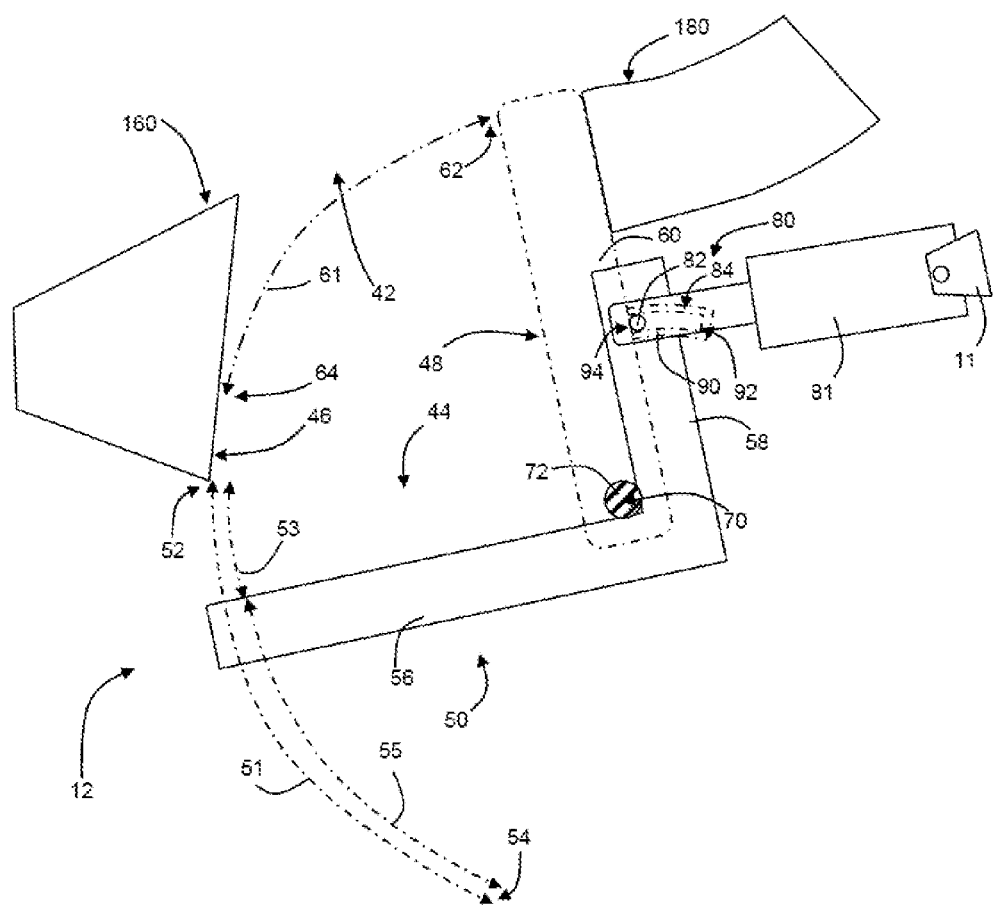
FIGS. 4 to 6 schematically shows further side views the embodiment of FIG. 2 during subsequent phases of its method of operation.

When the actuator 81 reaches the end of the movement of the door 50 along the initial range 53 of the door movement trajectory 51, it will reach the position shown in FIG. 4, where the pivot pin 82 abuts the second stop 94. After the actuator 81 has completed the movement of the door 50 along this initial range 53 of the door movement trajectory 51, the actuator 81 will continue to move the door further along its door movement trajectory 51 towards the evacuation position 54 from the position shown in FIG. 4, via that shown in FIG. 5, to that shown in FIG. 6. It is clear that, as according to this embodiment the door 50 is directly coupled to the actuator 81 by means of the pivot pin 82, the actuator 81 also continues to move along a corresponding subsequent range of movement of its actuator movement trajectory. As further shown, during this subsequent phase of the evacuation operation the stone trap assembly 12 moves from the state shown in FIG. 4, via that shown in FIG. 5 to the state shown in FIG. 6, in which the impeller 60 is also moved by the actuator 81 during the corresponding subsequent range of movement of the actuator 81. It is clear that, during this subsequent phase of the evacuation operation, the movement of the actuator 81 is also transferred to the impeller 60 as the pivot pin 82 abuts the second stop 94. In this way the coupler 84 thus provides the movement of the actuator 81 to the impeller 60 when the actuator 81 continues travelling along the subsequent range of the actuator movement trajectory and correspondingly moves the directly coupled door 50 along the corresponding subsequent range 55 of its door movement trajectory 51 towards the evacuation position 54.

Figure 5:
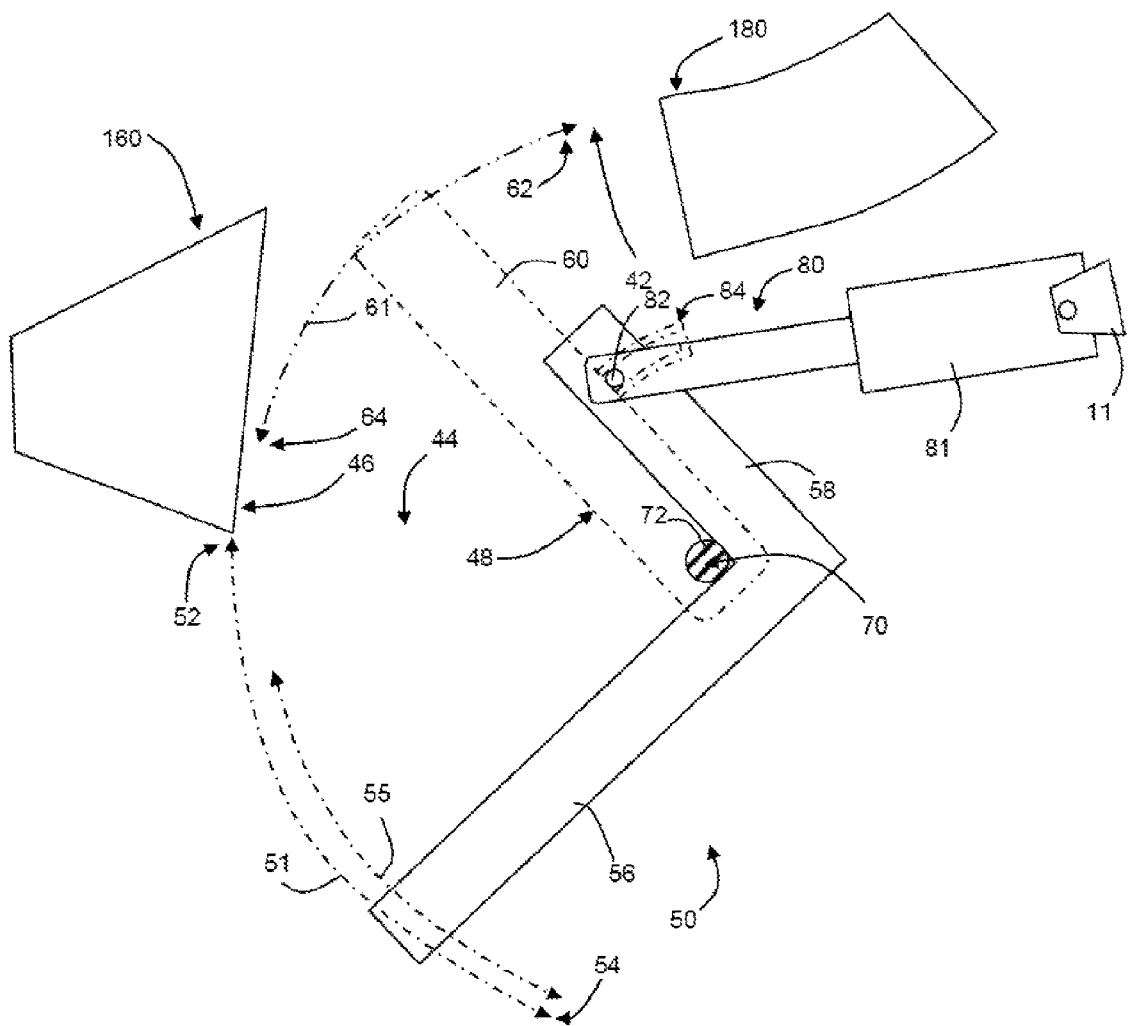

In the state of the stone trap assembly 12 shown in FIG. 5 the actuator 81 has already moved the impeller 60 partly away from the retracted position 62 of FIG. 4 along the impeller movement trajectory 61 towards the extended position 64. Concurrently, the actuator 81 continues the movement of the door 50 towards the evacuation position 54 along the subsequent range 55 of the door movement trajectory 51. In the state of the stone trap assembly shown in FIG. 6 the actuator 81 has continued movement of the impeller 60 along the impeller movement trajectory 61 until it reached the extended position 64. Concurrently the actuator 81 has also continued the movement of the directly coupled door 50 along the subsequent range 55 of the door movement trajectory 51 until it has reached the evacuation position 54. According to the embodiment shown, the movement transferred by the coupler 84 from the actuator 81 to the impeller 60 is a suitable rotation of the rotatably mounted impeller 60. This rotation of the impeller 60 around the rotation axis 70 towards its extended position 64 is imparted by the actuator 81 as the pivot pin 82 abuts the second stop 94 during the subsequent range of the actuator movement trajectory of the actuator 81. It is clear that concurrently with this rotating movement of the impeller 60, according to this embodiment, also the rotatably mounted door 50 continues its movement by means of rotating movement towards the evacuation position 54. The rotating movement of the door 50 is imparted by the directly connected actuator 81 as the actuator 81, pivot pin 82, lever arm 58 and fulcrums 72, 74 form a suitable linkage system for transferring the linear motion of the linear actuator 81 into a rotary motion of the bottom wall 56 of the door 50 along the door movement trajectory 51. It is clear that such a method of operation in which the impeller 60 is kept in the retracted position 62 until the door 50 has at least partly moved from the closed position 52 to the evacuation position 54 during an initial phase of the evacuation operation is beneficial, as before the impeller 60 engages the accumulated foreign objects, the exit 44 is at least partly opened, thereby more reliably facilitating evacuation of the foreign objects as there is a reduced risk of compacting or forcing the foreign objects against the walls of the stone trap assembly 12.

It is clear that alternative embodiments of the coupler 84 are possible, as long as the coupler 84, in the initial phase of the evacuation operation, allows movement of the actuator 81 along the initial range of the actuator movement trajectory, which provides the movement of the door 50 during the initial range 53 of the door movement trajectory 51, without imparting movement to the impeller 60. Subsequently, during the subsequent phase of the evacuation operation, such a coupler 84 also needs to provide the movement of the actuator 81 to the impeller 60 when the actuator 81 moves along the subsequent range of the actuator movement trajectory. The movement of the actuator 81, along this subsequent range of the actuator movement trajectory, also needs to provide for the movement of the door 50 along the subsequent range 55 of the door movement trajectory 51. Instead of a coupler 84 comprising a guide 90 and stops 92, 94, a coupler 84 comprising a suitable linkage assembly, a suitably controllable clutch assembly, etc. could be provided to couple the impeller 60 to the actuator 81, such that in the initial phase of the evacuation operation the impeller 60 remains positioned in the retracted position 62 during the initial range of the actuator movement trajectory of the actuator 81, and in the subsequent phase of the evacuation operation the coupler 84 transfers the movement of the actuator 81 to the impeller 60 so that it at least partly moves from the retracted position 62 to the extended position 64 during the subsequent range of the actuator movement trajectory of the actuator 81.

Figure 7:
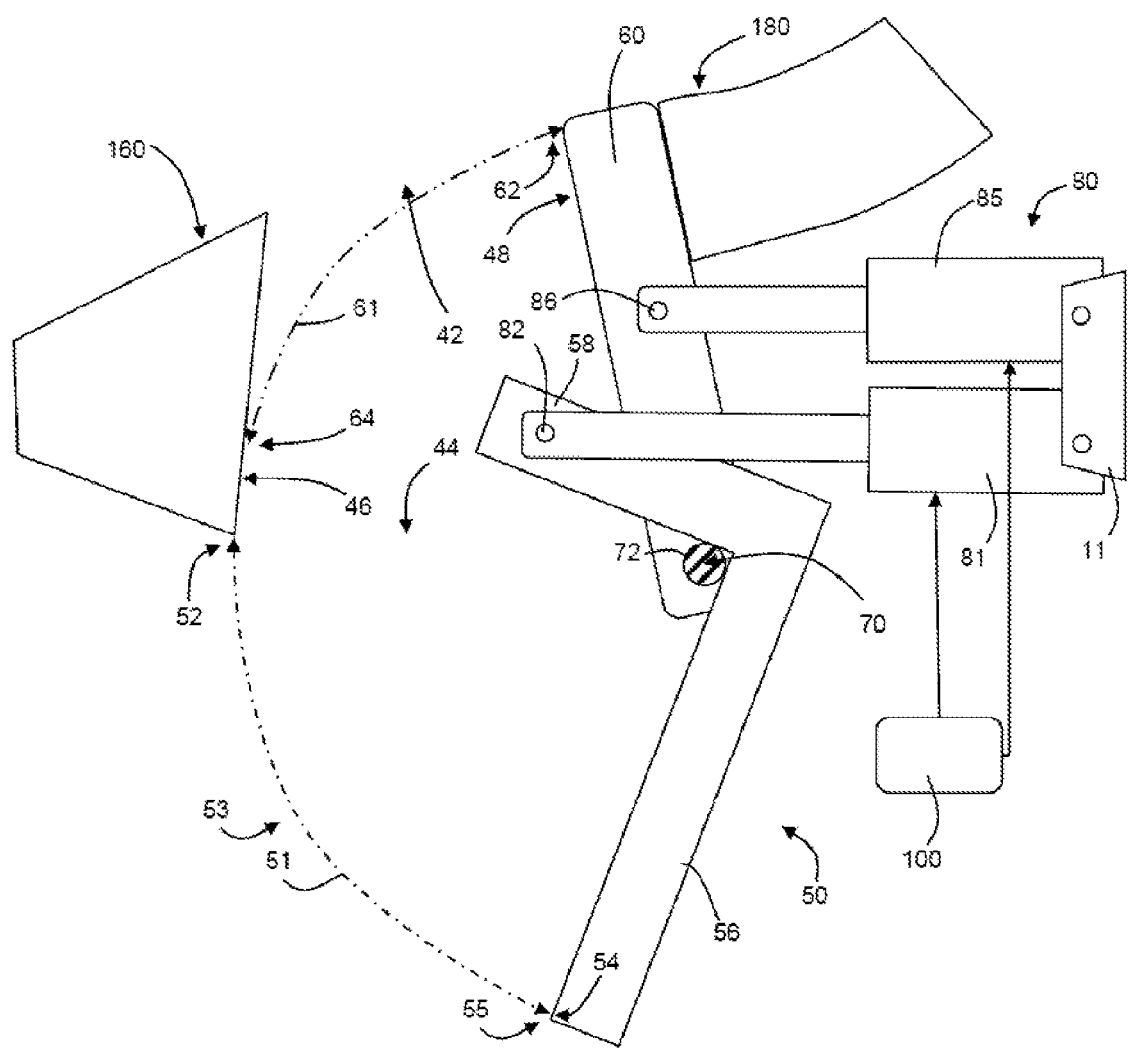
FIG. 7 schematically shows an alternative embodiment of the stone trap assembly.

It is clear that still further alternative embodiments of the drive assembly 80 are possible, for example comprising a separate actuator 81, 85 for both the door 50 and the impeller 60, as schematically shown in FIG. 7. According to this embodiment the drive assembly 80 comprises a door actuator 81 and an impeller actuator 85. The door actuator 81 is directly coupled at one end to the door 50 by means of the pivot pin 82. The impeller actuator 85 is similarly directly coupled at one end to the impeller 60 by means of a pivot pin 86. As shown both the door actuator 81 and the impeller actuator 85, which as shown are for example suitable linear actuators, are connected at their opposing end to the frame 11. The controller 100, which is connected to both the door actuator 81 and the impeller actuator 85, is for example suitably programmed to control the movement of both the door actuator 81 and said impeller actuator 85. In the state of the stone trap assembly 12 shown in FIG. 7, the controller 100 has moved the door 50 by means of its door actuator 81 along its door movement trajectory 51 from its closed position 52 to its evacuation position 54. Concurrently the controller 100 has kept the impeller 60 positioned in the retracted position 62 of its impeller movement trajectory 61 by means of the impeller actuator 85. The state of the stone trap assembly 12 shown in FIG. 7 could be reached under control of the controller 100 during an initial phase of the evacuation operation as explained above with reference to the embodiment of FIGS. 1 to 6. It is clear that in this particular case the initial range 53 of the door movement trajectory 51 corresponds to the entire door movement trajectory 51 from the closed position 52 to the evacuation position 54 of the door 50. Subsequently, during the subsequent phase of the evacuation operation, the controller 100 for example controls the impeller actuator 85 to move the impeller 60 along its impeller movement trajectory 61 from the retracted position 62 to the extended position 64. Concurrently, during this subsequent phase of the evacuation operation, the controller 100 for example controls the door actuator 81 to keep the door 50 positioned in the evacuation position 54, which can then be considered to be the subsequent range 55 of the door movement trajectory 51. In this way, the evacuation of foreign objects through the exit 44 by the impeller is optimized, as it occurs when the door 50 has opened up the exit 44 completely. Subsequently, during still a further phase of the evacuation operation, the controller 100 for example controls the door actuator 81 and the impeller actuator 85 to respectively position the door 50 and the impeller 60 again in respectively the closed position 52 and the retracted position 62 in preparation of a subsequent harvesting operation. Such a method of operation for performing an evacuation operation could for example be executed in an automated way upon reception of a suitable input signal from an operator of the harvester 10 for performing an evacuation operation. It is clear that, according to such a method of operation, during the initial phase of the evacuation operation the door 50 is moved along its door movement trajectory 51 separately from the impeller 60, and subsequently during the subsequent phase of the evacuation operation the impeller 60 is moved along its impeller movement trajectory 61 separately from the door 50. It is clear that according to alternative embodiments the controller 100 could control the door 50 during the initial phase of the evacuation operation to move separately from the impeller 60 along an initial range 53 comprising a suitable portion of the door movement trajectory 51 starting from the closed position 52 and not completely towards the evacuation position, similar as explained with reference to the embodiment of FIGS. 1 to 6. Subsequently the door 50 and impeller 60 could be concurrently moved until the door 50 reaches its evacuation position 54, after which the impeller 60 again separately continues its movement until it reaches the extended position 64.

According to an alternative embodiment of the method of operation of the stone trap assembly 12, the controller 100 could, upon reception of a suitable input signal from an operator of the harvester 10 in preparation of a servicing operation to components located in the vicinity of the stone trap assembly, control the door actuator 81 to move the door 50 along its door movement trajectory 51 from the closed position 52 to the evacuation position 54, separately from the impeller 60 which is positioned in the retracted position 62 by its impeller actuator 85. Thereby obtaining the state of the stone trap assembly 12 as shown in FIG. 7, which facilitates access to components of the harvester 10 through the stone trap assembly 12 as the door 50 and the impeller 60 both do not form an obstruction in the pathway through the stone trap assembly 12 to these components that extends between the exit 44 and the entrance 42.

Figure 8:
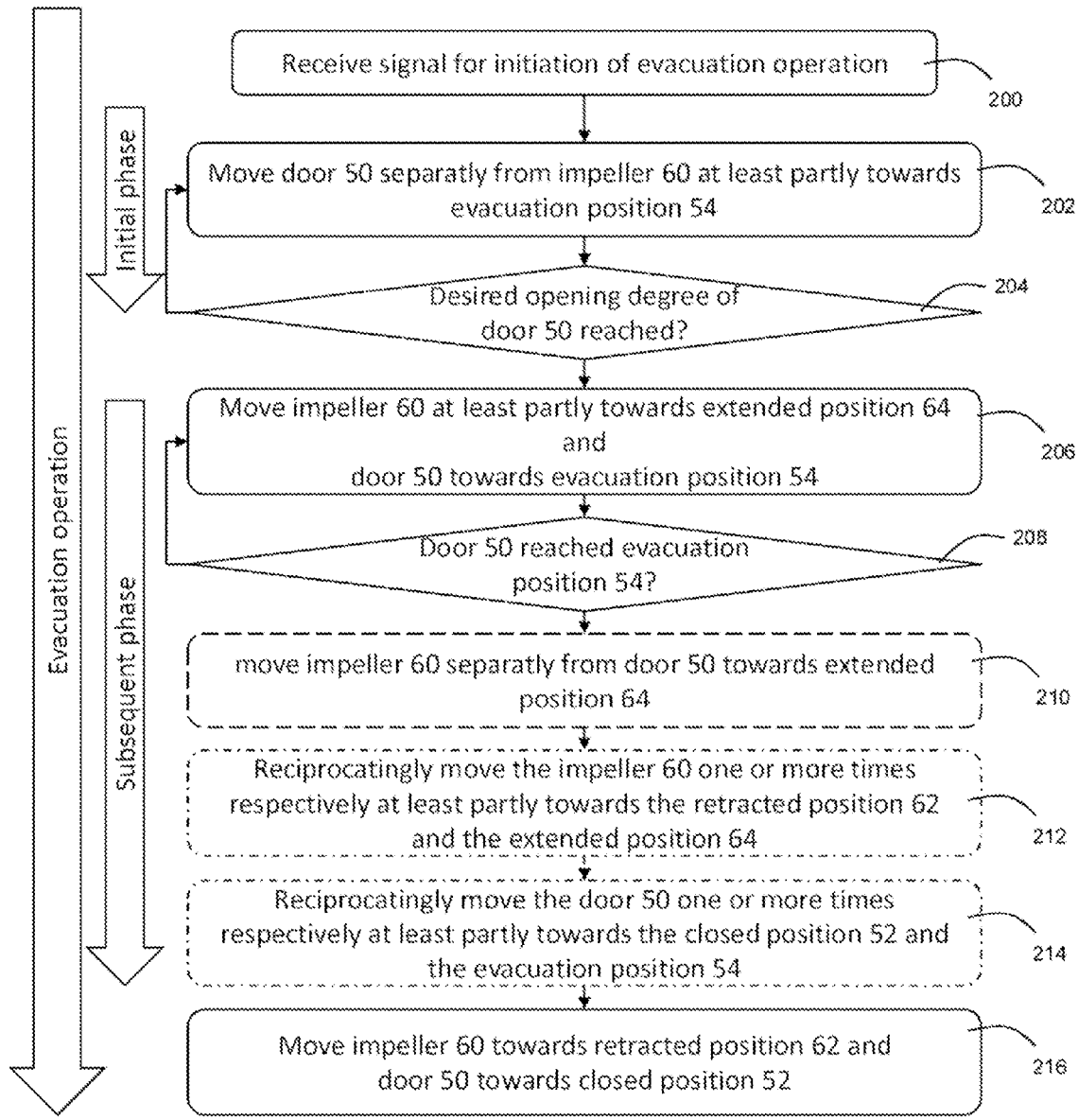
FIG. 8 schematically shows an embodiment of a method for operating the stone trap assembly according to the invention.

According to still a further embodiment method of operation of the stone trap assembly 12 during an evacuation operation is shown in FIG. 8. The method is initiated at step 200 by reception of a signal from an operator, for example by means of suitable input device coupled to the controller 100, for initiation of an evacuation operation. It is clear that, during the preceding harvesting operation, the door 50 was positioned in the closed position 52 and the impeller 60 was positioned in the retracted position 62. At step 202, the door 50 is moved, along its door movement trajectory 51, from its closed position 52 at least partly towards the evacuation position 54, separately from the impeller 60 which remains in the retracted position 62 until the door 50 has for example reached a desired position in which the exit 44 is opened to a desired degree at step 204 for increasing the efficiency of the evacuation operation. Subsequently, the impeller 60 is moved towards the extended position 64, while the movement of the door 50 continues towards the evacuation position 54. The desired opening degree of the door reached at step 204, when making use of an embodiment similar to that of FIGS. 1 to 6 can for example be chosen by a suitable adjustment of the relative position of for example adjustable stops 92, 94 with respect to guide 90. According to the embodiment described with reference to FIG. 7, it is clear that the desired opening degree reached at step 204 could be freely chosen by for example a suitable setting for the controller 100, and as explained above the door 50 could during this initial phase of the evacuation operation even be completely opened by moving to its evacuation position 54. It is clear that in such a case the method will immediately proceed via steps 206 and 208 to step 210.

When, after step 206, which initiates the subsequent phase of the evacuation operation, the door 50 has reached the evacuation position 54 at step 208, and the stone trap assembly 12 comprises an embodiment, such as for example that of FIG. 7 where the impeller 60 would at that moment not have reached the extended position 64, at step 210 the impeller 60 can be moved, separately from the door 50, towards its extended position 64. It is further clear that, according to the embodiments described above the subsequent phase follows the initial phase of the evacuation operation after the movement of the door 50 along the initial range 53 of the door movement trajectory 51 is completed.

According to optional step 212 the impeller 60 is reciprocatingly moved one or more times, respectively at least partly towards the retracted position 62 and the extended position 64. This repetitive and/or shaking movement still further reduces the risk that any material adheres to the walls of the stone trap assembly. According to optional step 214 also the door 50 could be reciprocatingly moved one or more times, respectively at least partly towards the closed position 52 and the evacuation position 54. It is clear that some embodiments of the stone trap assembly 12 might allow for separate reciprocation of the impeller 60 and/or the door 50, such as for example that of FIG. 7, while other embodiments would be limited to concurrent reciprocation, such as for example that of FIGS. 1 to 6. As further shown in FIG. 7, the evacuation operation is then finalized by moving the impeller 60 towards the retracted position 62 and the door towards the closed position 52 at step 216 in preparation of a subsequent harvesting operation.

It is clear that still further methods of operation the stone trap assembly 12 are possible as long as in general the door 50 and the impeller 60 are moved separately during at least a part of the door movement trajectory 51 and/or the impeller movement trajectory 61. As explained above, with respect to the described embodiments this can be achieved in an automated way by means of a suitable drive assembly 80 that is coupled to the door 50 and the impeller 60 in a way that allows to separately move the door 50 and the impeller 60 during at least a part of the door movement trajectory 51 and/or the impeller movement trajectory 61. However it is clear that according to alternative embodiments there could be provided for a manual operation according to the method of operation described above, for example by means of one or more suitable handles instead of a drive system 80. As described above, preferably the door 50 and impeller 60 are separately movable during the initial phase of the evacuation operation. However, according to still further embodiments it could also be advantageous when the door 50 and the impeller 60 are separately movable during any other suitable operation, for example as mentioned above in preparation of a servicing operation, to be able to gain access in a flexible way to components of the harvester in the vicinity of the stone trap assembly 12.

Although in the embodiments described above both the door 50 and the impeller 60 are imparted a rotational movement around the same rotation axis 70, it is clear that according to alternative embodiments the door 50 and the impeller 60 could each be suitably arranged for rotation about their own respective rotation axis, generally parallel to the transverse direction 29. According to still further embodiments, instead of a rotational movement, any other suitable movement, such as for example a translation, a combined translation and rotational movement, etc. are possible, as long as in general a suitable door movement trajectory 51 between a closed position 52 and an evacuation position 54 and a suitable impeller movement trajectory 61 between a retracted position 62 and an extended position 64 is provided for.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A stone trap assembly for a harvester, the stone trap assembly comprising:
    an entrance configured to allow reception of foreign objects from a crop flow path for accumulation into the stone trap assembly during a harvesting operation;
    an exit configured to allow evacuation of the accumulated foreign objects out of the stone trap assembly during an evacuation operation;
    a door configured to be rotatable around a first rotation axis, substantially transverse to the crop flow path, for movement along a door movement trajectory between a closed position, in which the door closes off the exit; and an evacuation position; in which the door opens up the exit;
    an impeller for forcing the accumulated foreign objects towards the exit, the impeller configured to be rotatable around a second rotation axis, substantially transverse to the crop flow path, for movement along an impeller movement trajectory between a retracted position and an extended position closer towards the exit; and
    a drive assembly coupled to the door and the impeller, the drive assembly being configured to separately move the door and the impeller such that, during an initial phase of an evacuation operation, the impeller remains positioned at the retracted position until the door has moved along an initial range of the door movement trajectory at least partially from the closed position to the evacuation position.

2. The stone trap assembly according to claim 1, wherein the first rotation axis coincides with the second rotation axis.

3. The stone trap assembly according to claim 1, wherein the drive assembly is further configured to move the impeller along the impeller movement trajectory, at least partly from the retracted position to the extended position, during a subsequent phase of the evacuation operation.

4. The stone trap assembly according to claim 3, wherein the drive assembly comprises a single actuator and a coupler; the actuator being directly coupled to the door and via the coupler to the impeller, the drive assembly being configured such that:
    during the initial phase of the evacuation operation, the coupler keeps the impeller positioned in the retracted position while the actuator moves the door along the initial range of the door movement trajectory; and
    during the subsequent phase of the evacuation operation, the coupler provides movement of the actuator to the impeller such that the impeller moves along the impeller movement trajectory, at least partly from the retracted position to the extended position, while the actuator continues the movement of the door towards the evacuation position along a subsequent range of the door movement trajectory.

5. The stone trap assembly according to claim 4, wherein the coupler is configured to:
    allow movement of the actuator along an initial range of an actuator movement trajectory, which provides the movement of the door during the initial range of the door movement trajectory; without imparting movement to the impeller; and
    provide the movement of the actuator to the impeller during movement of the actuator along a subsequent range of the actuator movement trajectory which provides for the movement of the door along the subsequent range of the door movement trajectory.

6. The stone trap assembly according to claim 4, wherein the coupler comprises:

a guide, coupled to the impeller and the actuator, and dimensioned to allow movement of the actuator with respect to the impeller during an initial range of an actuator movement trajectory;

a first stop coupled to the impeller and positioned such that, at a beginning of the initial range of the actuator movement trajectory, the actuator abuts this first stop, such that the impeller is held in its retracted position, when the door is in its closed position; and a second stop coupled to the impeller and positioned such that, at an end of the initial range of the actuator movement trajectory, the actuator abuts this second stop, such that the movement of the impeller is imparted by the actuator during a subsequent range of movement.

7. The stone trap assembly according to claim 1, wherein the drive assembly comprises a door actuator and an impeller actuator; the door actuator being coupled to the door and the impeller actuator being coupled to the impeller, the door actuator and the impeller actuator being configured to separately move respectively the door and the impeller during at least a part of the door movement trajectory or the impeller movement trajectory.

8. The stone trap assembly according to claim 1, wherein the door or the impeller are movable by a rotating movement around a respective rotation axis transverse to the crop flow path.

9. The stone trap assembly according to claim 1, further comprising a front wall and a back wall, both extending between the entrance and the exit, and extending longitudinally along a transverse direction transverse to the crop flow path, the front wall arranged upstream along the crop flow path with respect to the back wall.

10. The stone trap assembly according to claim 9, wherein the impeller at least partly comprises the back wall.

11. A stone trap assembly for a harvester, the stone trap assembly comprising:

an entrance configured to allow reception of foreign objects from a crop flow path for accumulation into the stone trap assembly during a harvesting operation;

an exit configured to allow evacuation of the accumulated foreign objects out of the stone trap assembly during an evacuation operation;

a door configured to be rotatable around a first rotation axis, substantially transverse to the crop flow path, for movement along a door movement trajectory between a closed position, in which the door closes off the exit, and an evacuation position, in which the door opens up the exit;

an impeller for forcing the accumulated foreign objects towards the exit, the impeller configured to be rotatable around a second rotation axis, substantially transverse to the crop flow path, for movement along an impeller movement trajectory between a retracted position and an extended position closer towards the exit; and a drive assembly coupled to the door and the impeller, the drive assembly being configured to independently actuate at least one of the door or the impeller relative to the other of the door or the impeller during at least a portion of the evacuation operation.

12. The stone trap assembly according to claim 11, wherein the drive assembly is configured to independently actuate the door and the impeller such that, during an initial phase of the evacuation operation, the impeller remains positioned at the retracted position until the door has moved along an initial range of the door movement trajectory at least partially from the closed position to the evacuation position.

13. The stone trap assembly according to claim 11, wherein the first rotation axis coincides with the second rotation axis.

14. The stone trap assembly according to claim 11, wherein the drive assembly is further configured to move the impeller along the impeller movement trajectory, at least partly from the retracted position to the extended position, during a subsequent phase of the evacuation operation.

15. The stone trap assembly according to claim 14, wherein the drive assembly comprises a single actuator and a coupler, the actuator being directly coupled to the door and via the coupler to the impeller, the drive assembly being configured such that:

during the initial phase of the evacuation operation, the coupler keeps the impeller positioned in the retracted position while the actuator moves the door along the initial range of the door movement trajectory; and during the subsequent phase of the evacuation operation, the coupler provides movement of the actuator to the impeller such that the impeller moves along the impeller movement trajectory, at least partly from the retracted position to the extended position, while the actuator continues the movement of the door towards the evacuation position along a subsequent range of the door movement trajectory.

16. The stone trap assembly according to claim 15, wherein the coupler is configured to:

allow movement of the actuator along an initial range of an actuator movement trajectory, which provides the movement of the door during the initial range of the door movement trajectory, without imparting movement to the impeller; and provide the movement of the actuator to the impeller during movement of the actuator along a subsequent range of the actuator movement trajectory which provides for the movement of the door along the subsequent range of the door movement trajectory.

17. The stone trap assembly according to claim 15, wherein the coupler comprises:

a guide, coupled to the impeller and the actuator, and dimensioned to allow movement of the actuator with respect to the impeller during an initial range of an actuator movement trajectory;

a first stop coupled to the impeller and positioned such that, at a beginning of the initial range of the actuator movement trajectory, the actuator abuts this first stop, such that the impeller is held in its retracted position, when the door is in its closed position; and a second stop coupled to the impeller and positioned such that, at an end of the initial range of the actuator movement trajectory, the actuator abuts this second stop, such that the movement of the impeller is imparted by the actuator during a subsequent range of movement.

18. The stone trap assembly according to claim 11, wherein the drive assembly comprises a door actuator and an impeller actuator, the door actuator being coupled to the door and the impeller actuator being coupled to the impeller, the door actuator and the impeller actuator being configured to independently move respectively the door and the impeller during at least a part of the door movement trajectory or the impeller movement trajectory.

19. The stone trap assembly according to claim 11, wherein the door or the impeller are movable by a rotating movement around a respective rotation axis transverse to the crop flow path.

20. The stone trap assembly according to claim 11, further comprising a front wall and a back wall, both extending between the entrance and the exit, and extending longitudinally along a transverse direction transverse to the crop flow path, the front wall arranged upstream along the crop flow path with respect to the back wall.

\* \* \* \* \*